No. 750,161. PATENTED JAN. 19, 1904.
W. C. BRIGGS.
MACHINE FOR STEMMING TOBACCO LEAVES.
APPLICATION FILED APR. 29, 1903.
NO MODEL. 5 SHEETS—SHEET 1.
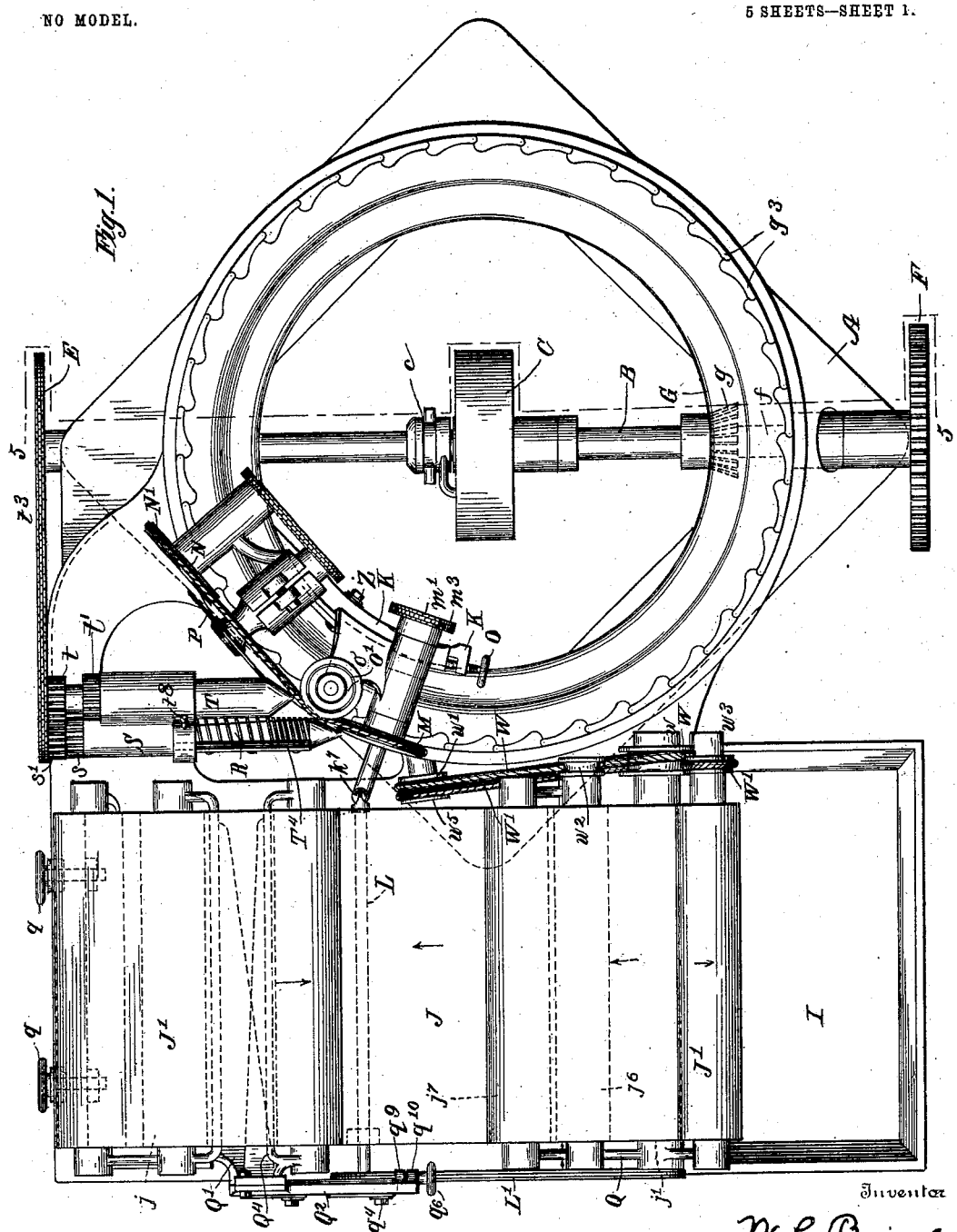

No. 750,161. PATENTED JAN. 19, 1904.
W. C. BRIGGS.
MACHINE FOR STEMMING TOBACCO LEAVES.
APPLICATION FILED APR. 29, 1903.
NO MODEL. 5 SHEETS—SHEET 2.
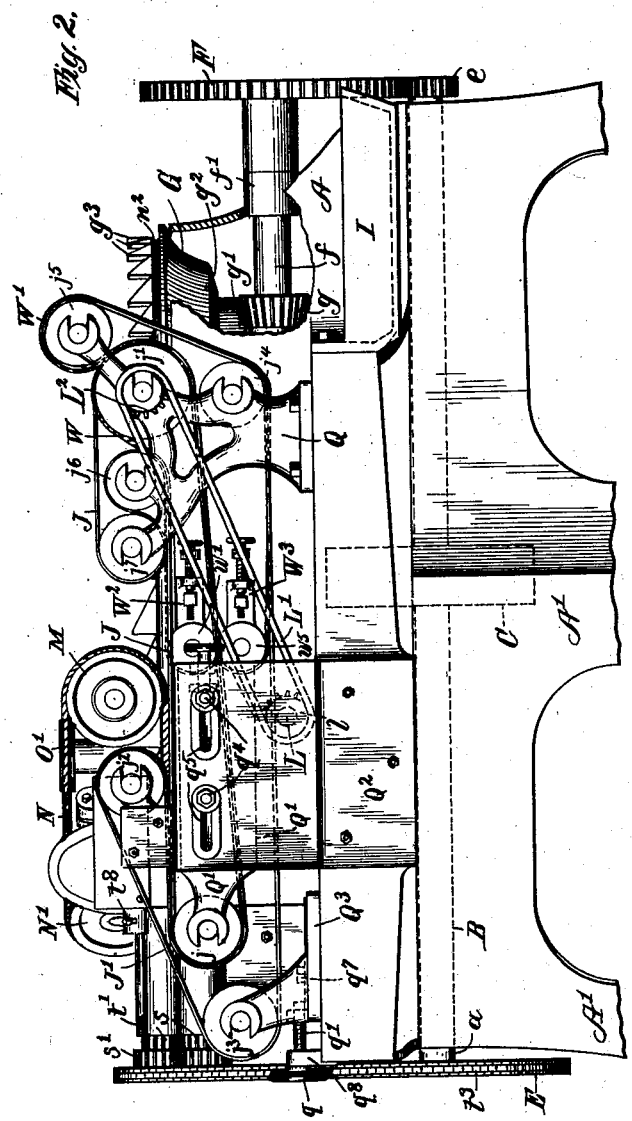
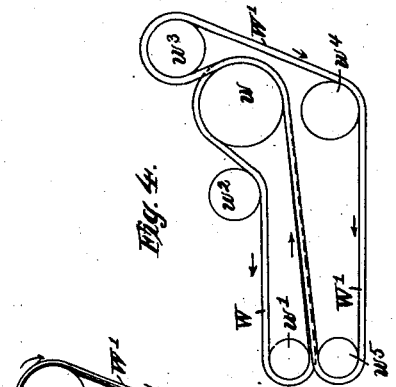
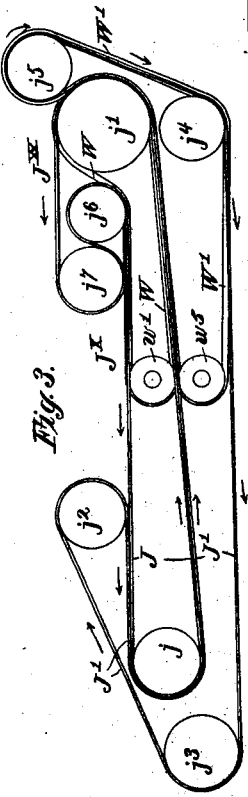
Witnesses
H. S. Austin
A. M. Parkins
Inventor
W. C. Briggs
By Baldwin Davidson Wight
his Attorneys

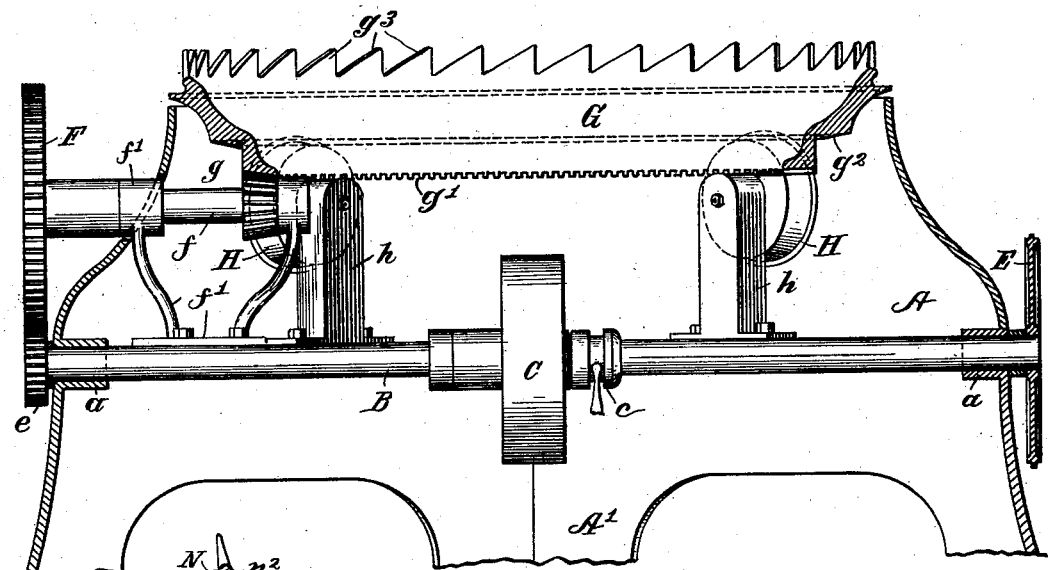
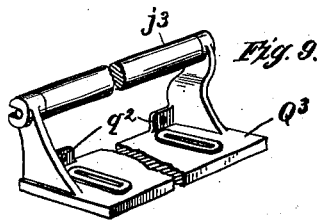
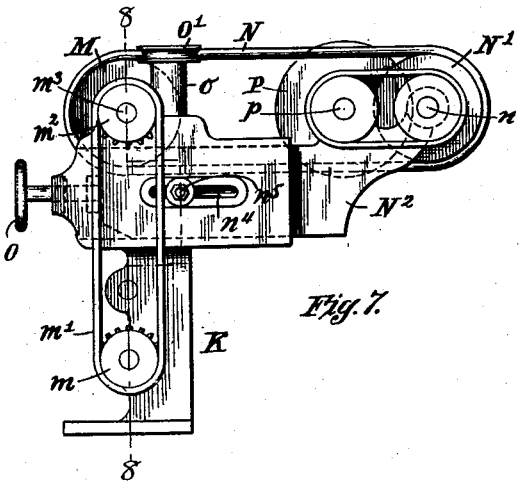

No. 750,161. PATENTED JAN. 19, 1904.
W. C. BRIGGS.
MACHINE FOR STEMMING TOBACCO LEAVES.
APPLICATION FILED APR. 29, 1903.
NO MODEL. 5 SHEETS—SHEET 4.
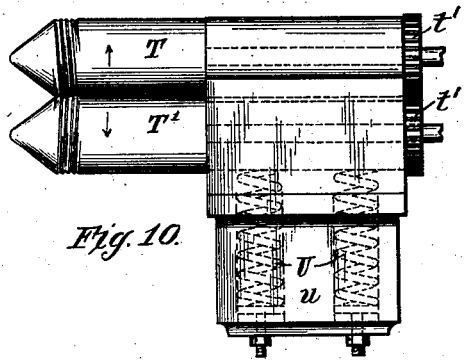
Fig. 10.
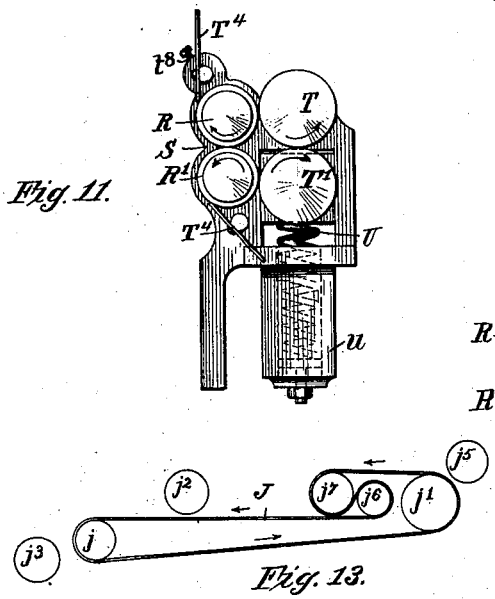
Fig. 11.
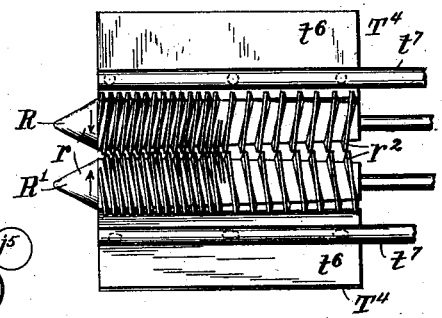
Fig. 12.
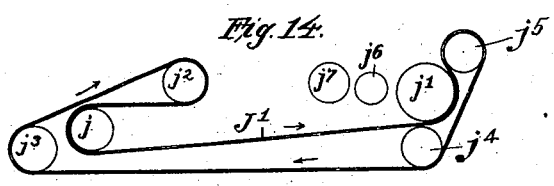
Fig. 13.
Fig. 14.
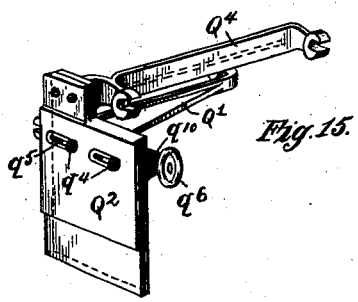
Fig. 15.
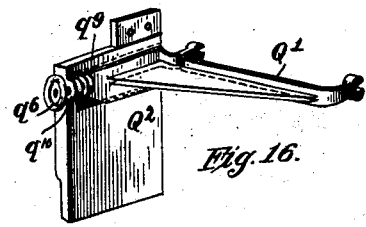
Fig. 16.
Witnesses
H. J. Austin
A. M. Parkins
Inventor
W. C. Briggs
By Baldwin, Davidson & Wight
his Attorneys No. 750,161. PATENTED JAN. 19, 1904.
W. C. BRIGGS.
MACHINE FOR STEMMING TOBACCO LEAVES.
APPLICATION FILED APR. 29, 1903.
NO MODEL. 5 SHEETS—SHEET 5.
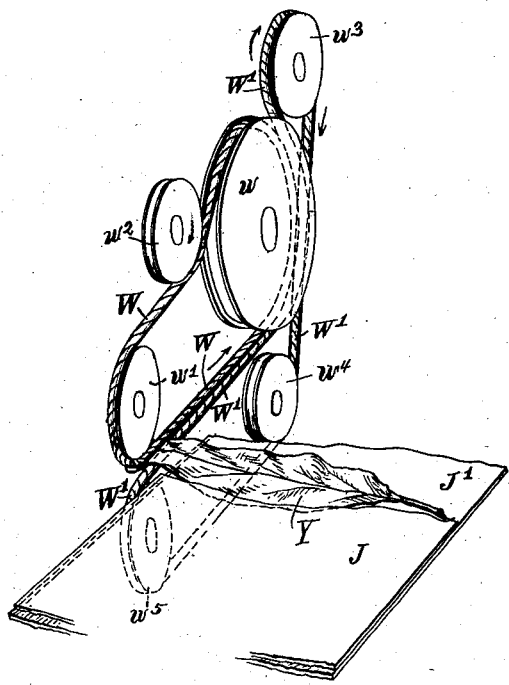
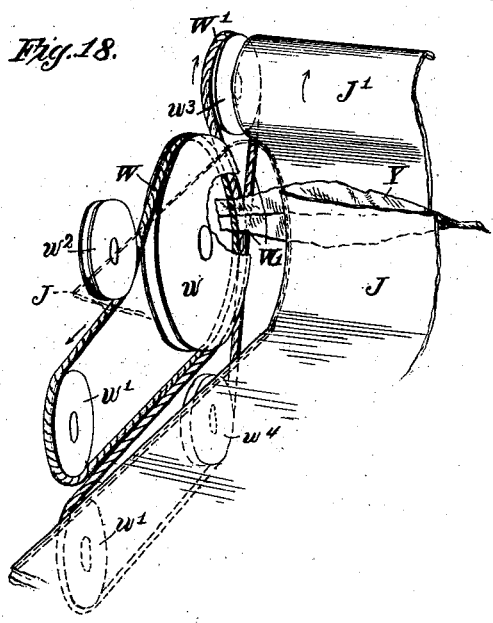
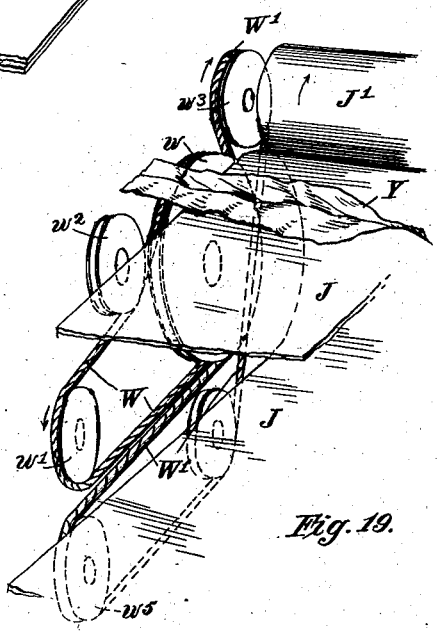

No. 750,161. Patented January 19, 1904.

UNITED STATES PATENT OFFICE.

WILLIAM C. BRIGGS, OF WINSTON-SALEM, NORTH CAROLINA.

MACHINE FOR STEMMING TOBACCO-LEAVES.

SPECIFICATION forming part of Letters Patent No. 750,161, dated January 19, 1904.

Application filed April 29, 1903. Serial No. 154,866. (No model.)

*To all whom it may concern:*

Be it known that I, WILLIAM C. BRIGGS, a citizen of the United States, residing at Winston-Salem, in the county of Forsyth and State of North Carolina, have invented certain new and useful Improvements in Machines for Stemming Tobacco-Leaves, of which the following is a specification.

My invention relates to machines for removing stems from leaves, particularly tobacco-leaves; and the principal object of my invention is to provide means for feeding leaves to the stemming mechanism and for automatically returning to such mechanism leaves which have passed by it without having had the stems removed.

In all prior machines of this class with which I am acquainted unstemmed leaves have either been carried to supplemental mechanism, have become mixed with the stemmed leaves, or have been carried away from the machine to be gathered up by hand and fed back to the machine or stemmed by hand. In the machine shown in my application for patent, Serial No. 125,579, filed October 1, 1902, I have made an advance on the prior machines by providing means which feed back to the supply-tray in close proximity to the attendant such leaves as pass by the stemming mechanism. According to my present invention I provide means which automatically feed back to the stemming mechanism all leaves that pass by it when first being fed thereto.

In my above-named application I have shown very efficient means for stemming tobacco-leaves, and the percentage of unstemmed leaves is comparatively small; but inasmuch as the device which I have provided for automatically returning unstemmed leaves to the stemming mechanism is quite simple I prefer to use such device on the machine shown in said application.

In the accompanying drawings I have shown my improvements applied to a tobacco-stemming machine similar to that shown in my before-mentioned application; but I wish it distinctly understood that the present improvements may be applied to various other machines; but inasmuch as I deem it desirable to show a machine capable of performing all the necessary operations in stemming tobacco-leaves I have chosen to illustrate my improvements applied to my machine described in said application.

Figure 1 shows a top plan view of a tobacco-stemming machine with my improvements applied. Fig. 2 shows a front elevation thereof with some of the parts broken away. Fig. 3 is a diagram of the main feed-belts and supplemental feeding devices. Fig. 4 is a diagram of the supplemental feeding devices. Fig. 5 shows a section on the line 5 5 of Fig. 1. Fig. 6 is a detail view showing how the toothed carrier-ring is supported. Fig. 7 is a view of the mechanism for operating the endless band that coöperates with the toothed carrier to feed the leaves to the stemming mechanism. Fig. 8 shows a vertical section thereof on the line 8 8 of Fig. 7. Fig. 9 is a detail view in perspective of one of the adjustable brackets which support the feed-aprons. Fig. 10 is a detail view showing the manner in which the stem-drawing rolls are yieldingly supported. Fig. 11 shows an end elevation thereof, and this figure also shows the stemming-rolls, which coöperate with the stem-drawing rolls. Fig. 12 is a detail view of the stemming-rolls and the guards used in connection therewith. Fig. 13 is a diagram of one of the main feed-aprons shown in Fig. 3, and Fig. 14 is a diagram of the other main feed-apron shown in Fig. 3. Figs. 15 and 16 are detail views showing in perspective one of the brackets for supporting the feed-aprons. Figs. 17 to 19, inclusive, are diagrams illustrating the operation of the supplemental leaf-feeding devices.

As before stated, much of the mechanism shown in the drawings is substantially the same as that shown in my before-mentioned application; but I will proceed to describe in detail the entire machine and will point out at the end of the specification the subject-matter herein claimed.

The main frame A, which is supported by standards A', may be of any construction suitable to support the mechanism.

In suitable bearings $a$ is mounted a horizontal shaft B, carrying a belt-pulley C, provided with a clutch c. At one end of the shaft is a sprocket-pulley E, and at its opposite end the shaft carries a pinion e, which meshes with a large spur-wheel F on a short shaft f, mounted in bearings in a bracket f', secured to the top of the main frame. The shaft f carries at its inner end a bevel-pinion g, meshing with a continuous series of teeth g' on the under side of a ring or annular carrier G, supported by wheels H, mounted in brackets h, attached to the top of the main frame. The arrangement is such that the carrier G is held in a horizontal position by the wheels and guided thereby, so as to revolve freely when actuated by the pinion g. The wheels H are preferably flanged, as shown, and have inclined peripheries corresponding with the annular surface $g^2$ on the under side of the carrier. The upper edge of the ring G is formed with an annular series of teeth $g^3$ for a purpose hereinafter described.

The unstemmed leaves are piled in a trough I, formed with or secured to the main frame. The leaves are fed to the stemming mechanism by endless carriers or feed-aprons J' J'. The apron J traverses four rollers $j$, $j'$, $j^6$, and $j^7$, as indicated particularly in Fig. 13. The apron J' traverses the rollers $j^2$, $j^3$, $j^4$, and $j^5$ and also passes around the rollers $j$ $j'$. This is clearly indicated in Fig. 14. The directions in which the aprons move and in which their supporting-rollers revolve is indicated by arrows in Figs. 3, 13, and 14. The apron J is held comparatively taut, while the apron J' is comparatively loose. The latter apron runs in frictional contact with the apron J for a part of its length, a portion of the upper surface of the apron J being left open or exposed at $J^\times$ and at $J^{\times\times}$.

It will be observed that the several rollers which support the aprons J J' are arranged in such manner that the apron J is so held that it has a long horizontal loop portion, a shorter overhanging loop at one end, and a vertical portion connecting the two loops. (See Fig. 13.) The apron J' has a long loop immediately before the long loop of the apron J, an overhanging portion at the delivery end of said apron, and a vertical portion at the opposite end adjacent to the corresponding vertical portion of said apron J. The two aprons run in frictional contact with each other to the extent clearly shown in the drawings. The manner in which the leaves are carried by the aprons will be explained at the close of the specification when describing the operation of the machine. The leaves are laid by hand on the apron J either at $J^\times$ or $J^{\times\times}$ and travel with the apron, as indicated by the arrows, toward the roller $j$, being pressed between the aprons J J' where the aprons overlap on the upper side of the apron J. Motion is imparted to the aprons in the following manner: A bracket K (shown in Figs. 7 and 8) is attached to the top of the frame A at the point marked Z in Fig. 1. This bracket has a vertical part $k$ and a shorter parallel part $k'$, between which is arranged a pinion $k^2$ on a shaft $k^3$, which has bearings in the parts $k$ and $k'$. Just above the pinion $k^2$ is another pinion $k^6$, secured to a shaft $k^4$, having bearings in the vertical portions of the bracket above referred to. The pinion $k^6$ meshes with the pinion $k^2$, and it is formed in one piece with another pinion, $k^5$, which meshes with the teeth $g'$ of the annular carrier G. The pinions $k^2$, $k^5$, and $k^6$ are fast on their shafts, and the shaft $k^4$ is connected by a universal joint $k^7$ with a shaft L, mounted in bearings below the carrier-aprons J J' and carrying a sprocket-pulley $l$, which receives a sprocket-chain L', gearing with a sprocket-wheel $L^2$ on the shaft of the roller $j''$. Motion is imparted to the shaft L by the gearing shown in Figs. 5, 7, and 8, and motion is communicated from the shaft L to the roller $j''$, and it is communicated to the aprons J J' in an obvious manner—i. e., as the roller $j''$ is revolved the apron J is moved, and as the apron J is in frictional contact with the apron J' the latter is correspondingly moved. The trunnions of the rollers $j''$, $j^4$, $j^6$, $j^7$, and $j^5$ are mounted in bearings in stationary brackets Q, secured to the main frame near the trough I. The trunnions of the roller $j^2$ are mounted in bearings in the stationary bracket $Q^4$, projecting from an upright bracket $Q^2$, secured to the main frame. The trunnions of the roller $j^3$ are mounted in bearings in upwardly-projecting arms of a bracket $Q^3$, adapted to slide on the main frame and adjustable therein by means of hand-wheels $q$, having screw-shanks $q'$, engaging lugs $q^2$ on the bracket and extending through openings in lugs $q^8$ on the main frame. The bracket has a slotted base through which extend guide-bolts $q^7$. The roller $j$ is carried by a bracket Q', sliding in ways in the bracket $Q^2$ and attached thereto by bolts $q^4$, passing through slots $q^5$ in the bracket $Q^2$. The bracket Q' may be adjusted by a hand-wheel $q^6$, having a screw-shank bearing against a lug $q^9$ on said bracket and extending through a screw-threaded opening in a lug $q^{10}$ on the bracket $Q^2$. The bearings for the trunnions of the several rollers are open, and by properly adjusting the hand-wheels the desired tension may be given to the aprons, and consequently the desired pressure on the leaves passing between the aprons may be obtained.

Referring again to Figs. 7 and 8, it will be observed that a sprocket-wheel $m$ is secured on the shaft $k^3$, and this wheel is connected by means of a chain $m'$ with a sprocket-wheel $m^2$ on a shaft $m^3$, mounted in bearings in the upper end of the bracket K. This shaft has secured to its opposite end a grooved pulley M, around which extends an annular band N, which also extends around a grooved pulley N', secured to a shaft $n$, mounted in bearings in a sliding bracket $N^2$. The band is arranged to travel in an annular recess $n^2$ in the periphery of the carrier G outside the series of teeth $g^3$. The bracket $N^2$ extends horizontally through a guide $n^3$ in the bracket K, the latter being slotted at $n^4$, while a bolt $n^5$, passing through the slot, connects the brackets $N^2$ and K, but permits the former to slide horizontally in the latter. A hand-wheel O, having a screw-shank passing through a nut in the bracket K, bears against the bracket $N^2$ and by means of it this bracket may be given the desired adjustment to vary the tension of the band N. An idle pulley O', mounted in bearings in a bracket $o$, rising from the bracket K, engages the band N and directs its course in the manner indicated in Fig. 1.

P indicates a rotary cutting-disk attached to a horizontal shaft $p$, mounted in bearings in the bracket $N^2$ and geared to the shaft $n$ in the manner clearly indicated in Figs. 1 and 7.

The stemming or stripping rolls R R' are arranged one above the other with parallel axes and revolve in bearings in a bracket S, secured to the main frame. These rolls are geared to each other by cog-wheels $s$, and a cog-wheel $s'$ on one of the rolls gears with a corresponding wheel $t$ on one of the stem-drawing or traction rolls T T', which latter are also mounted in bearings in the bracket S and are geared together by toothed wheels $t'$. The sprocket-pulley E is geared with one of the rolls T T' by a chain $t^3$.

The stem-drawing or traction rolls T T' are for the most part made plane and cylindrical with their peripheries held yieldingly in contact with each other by springs U, mounted in frames $u$ and pressing on the lower bearings of the bottom roll T'. The ends of both rolls next the feed mechanism are tapered abruptly for the purpose of guiding the stems into position between them, and both rolls are preferably threaded at the inner ends of their tapered portions for the purpose of feeding the stems into the bite of the rolls, insuring that they shall take a proper hold thereon.

The stemming-rolls R R' revolve about parallel axes, and their ends next the feed mechanism are tapered abruptly at $r$ in order that the leaves may be directed properly into engagement with the rolls. From the inner ends of the tapered portion $r$ the rolls are tapered gradually toward their opposite ends, thus forming a space between them which gradually increases in width from the ends $r$ inward. Each roll is threaded preferably by being provided with a spiral rib $r^2$, which extends from the end $r$ to the opposite end of the roll. The edges of the threads on one roll are preferably arranged close to the edges of the other roll. The threads on the entrance end of each roll next the portion $r$ and for about half the length of the roll are somewhat finer—that is, the spirals are closer together than at the opposite or exit end of the roll. By this arrangement of the threads of the two rolls a continuous spiral channel is formed between them. Preferably two separate threads or spirals are used on each roll, one thread extending substantially the entire length of the roll, while the other thread extends about half the length of the roll and is wound between the convolutions of the other thread. The threads on the two rolls gradually increase in depth, and the longitudinal space between the two rolls is divided by the spirals into a series of openings which gradually increase in area from the entrance ends of the rolls to the opposite ends thereof for the purpose of accommodating the gradually-increasing diameter of the stem.

The tobacco is prevented from winding about the stemming-rolls by guards $T^4$ of suitable construction. These guards, as shown, each consist of a plate $t^6$, secured to a rod $t^7$, the end of which is held in a socket in a lug of the bracket S by a set-screw $t^8$. By turning the rod about its axis the position of the guards relatively to the stemming-rolls may be adjusted.

In operation the aprons move the leaves toward the stemming mechanism. The tip of each leaf is first engaged by the band N, which presses the leaf against the periphery of the annular carrier, and then that portion of the leaf in rear of the tip is directed into engagement with the stemming-rolls R R'. These rolls revolve in the direction indicated by the arrows and tend to force the leaf backward away from the carrier G; but as the stem passes freely between the spirals and is held firmly by the carrier G and the band N the stem instead of being forced backward is drawn forward, while the portion of the leaf with which the stemming-rolls engage on opposite sides of the stem are separated therefrom and piled up on that side of the stemming-rolls next the feed-aprons. As the leaf is moved farther on by the aprons J J', the carrier G, and the band N, it will move into engagement with the stem-drawing rolls T T', which revolve in the direction indicated by the arrows—*i. e.*, in an opposite direction to that of the stemming-rolls R R'—and tend to draw the leaf forward, while the stemming-rolls tend to force it backward or retard its forward movement. The stem, however, is not pushed backward by the stemming-rolls, because it is loosely arranged in the openings between them. The effect of this organization is to draw the stems forward while the leaf is being fed laterally or sidewise by the aprons, and the wings of the leaf on opposite sides of the stem are forced backward or held back and are stripped from the stem, piling up on that side of the stemming-rolls next the feed-aprons. As the leaf is being fed sidewise the stem moves transversely freely between the stemming-rolls, in fact being fed laterally at the proper speed by the spirals on these rolls.

Before the leaf has reached the inner ends of the stemming-rolls the wings are entirely removed from the stem, the latter falling on the floor or into a suitable receptacle after passing through the drawing-rolls and the wings falling on the floor or into a receptacle below the stemming-rolls. Just after the wings have been separated from the stem the tip is separated from the stem by the cutter P. The tip being of good tobacco (the stem which it contains being small, soft, and pliable) falls on the floor or into a suitable receptacle. The stem-drawing rolls revolve at a high rate of speed and when they once fairly engage the stems quickly withdraw them from the wings of the leaves and discharge them into a pile on the floor or into a suitable receptacle.

In the stemming of tobacco-leaves it sometimes happens that a leaf with a broken stem will be encountered or a leaf with some unusual formation may be presented to the stemming mechanism or the attendant may now and then supply the leaves carelessly, so that the stemming mechanism will not receive and act up them in the usual way. In my application for patent above mentioned I have shown means whereby when a leaf is carried by the aprons past the stemming mechanism it will follow the aprons back to a point near where it was placed on them. In the particular construction shown unstemmed leaves of this kind were carried back and discharged into the supply-tray I, from which they could be again taken by hand and placed on the top of the feed-apron J; but according to my present invention I so arrange the aprons J J' that unstemmed leaves instead of being discharged in the supply-tray are automatically carried back to the stemming mechanism. The arrangement of the aprons for this purpose is indicated in Figs. 3, 13, and 14 and has been before described. It generally happens that when a leaf is broken the break occurs just inside the tip, which would most likely be close to the inner edge of the aprons next the carrier G. This being the case, when an unstemmed leaf is fed back over the roller $j'$ to the place marked $J^{\times\times}$ its outer or tip end would not project far enough from the aprons to engage the toothed carrier or the band N. It is true that when a leaf comes back in this way the attendant may push it forward into engagement with the carrier; but I prefer to employ automatic means which will coöperate with the aprons J J' to return the leaves to the starting-point and will also project them laterally to a small extent from the aprons, so that they may properly engage the toothed carrier. The devices for this purpose are indicated in Figs. 1 to 4, inclusive, and are also clearly shown in Figs. 17 to 19 and consist of two endless cords W W', arranged to travel about a series of pulleys. The cord W passes around a grooved pulley $w$ on the shaft of the roller $j'$ and around a grooved pulley $w'$, mounted in suitable bearings in an adjustable bracket $W^2$, attached in any suitable way to the main frame. A grooved pulley $w^2$ on the shaft of the roller $j^6$ bears on the cord W and causes it to surround the pulley $w$ to the desired extent. The cord W' passes around a grooved pulley $w^3$ on the shaft of the roller $j^5$, around a grooved pulley $w^4$ on the shaft of the roller $j^4$, and around a grooved pulley $w^5$, mounted in suitable bearings in an adjustable bracket $W^3$ on the main frame. The cord W' also moves in contact with the large grooved pulley $w$. These cords W W' are arranged to run in the same direction close together near the edge of the under portion of the apron J—namely, that portion which moves rearwardly from the stemming mechanism toward the supply-tray. As indicated in Fig. 1 and also in Figs. 17 to 19, inclusive, the cords W W' are inclined slightly relatively to the inner edge of the apron J, so that when a tobacco-leaf is engaged by the cords it will be moved rearwardly toward the supply-tray and will also be moved laterally to a slight extent.

Figs. 17 to 19 show the manner in which the leaf is engaged by the aprons and cords and has its direction of motion reversed, so that it may be automatically fed back to the stemming mechanism. In Fig. 17 the leaf Y, having passed by the stemming mechanism and been carried back between the under side of the apron J and the surface of the apron J' in contact therewith, has engaged the cords W W' and is being carried away from the stemming mechanism. In Fig. 18 the leaf is shown as being partially elevated, being carried by the aprons J J' and the cords W W'. As soon as the leaf reaches the top of the roller $j'$ it will follow the direction of movement of the apron J and cord W, as indicated in Fig. 19, and will therefore come into position in front of the attendant, who can see that it is in proper position to engage the toothed carrier and band N. From the portion $J^{\times\times}$ of the apron the leaf drops to the portion $J^{\times}$ thereof and then engages the toothed carrier G and the band N.

Broken stems are often found in tobacco as it comes to the machine. These breaks occur at various points of the stems, and several breaks sometimes occur in the same stem. Leaves with such broken stems cannot be handled in stemming-machines in the same manner as other leaves. My machine is adapted to feed such leaves; but it is sometimes necessary for parts of the leaves to pass by the stemming mechanism several times. When the stem of a leaf is broken near its larger end, the leaf passes by the stemming mechanism repeatedly and will pass repeatedly through the cords W W' until these cords advance the leaf far enough laterally for the cord N and carrier G to grasp the unstemmed portion of the leaf. In case the leaf is not advanced far enough at one time for its broken part to be engaged by the cord and carrier a portion only of the leaf would be stemmed, while the other portion would be returned again and again until all parts of the leaf have been stemmed. Thus even though a leaf had the stem broken at several points it may be thoroughly stemmed by being fed repeatedly to the stemming mechanism.

It is not thought necessary to further describe the construction and operation of the machine, in view of what is shown and described in my before-mentioned application.

As before stated, I wish it distinctly understood that I do not limit my present invention to the specific form of machine shown, as the improved feed mechanism may be applied to machines of various kinds, and I wish to state, further, that the details of the improved feed mechanism may be varied without departing from the novel features of my invention.

I claim as my invention—

1. In a leaf-stemming machine the combination with stemming mechanism of means for feeding leaves thereto, and for automatically moving unstemmed or broken leaves past and returning them to the stemming mechanism.

2. In a leaf-stemming machine the combination of stemming mechanism, means for feeding leaves thereto, and devices which receive leaves that pass the stemming mechanism and automatically return them to said stemming mechanism.

3. In a leaf-stemming machine, the combination with stemming mechanism, of means for feeding leaves thereto sidewise, and for automatically returning the leaves to such mechanism, and supplemental means for moving the leaves endwise while returning.

4. In a leaf-stemming machine, the combination with stemming mechanism, of overlapping feed-aprons for feeding leaves toward the stemming mechanism, and for automatically returning leaves thereto, and endless cords for assisting the aprons in reversing the movement of the leaves.

5. In a leaf-stemming machine, the combination with leaf-stemming mechanism, of overlapping feed aprons for feeding leaves toward the stemming mechanism, and for automatically returning leaves thereto, and endless cords coöperating with the feed-aprons and inclined relatively thereto to move the leaves endwise.

6. In a leaf-stemming machine, the combination with stemming mechanism of endless feed-aprons having overlapping portions at opposite ends, and which extend past the stemming mechanism and carry leaves thereto, and endless cords at one end of the aprons for giving an endwise movement to the leaves.

7. In a leaf-stemming machine, the combination with stemming mechanism, of an endless feed-apron having a lower horizontal loop and an upper, overhanging horizontal loop of less length, connected to the lower loop by a vertical portion, and a second endless apron having a portion overhanging and in contact with the lower loop of the first apron, and a portion running beneath and in contact with said loop, and another portion running in contact with the vertical portion of the first apron.

8. In a leaf-stemming machine the combination with stemming mechanism, of overlapping feed-aprons between which the leaves are fed toward the stemming mechanism, and which after passing the stemming mechanism return and feed broken or unstemmed leaves in a reverse direction away from the stemming mechanism, and then again toward the stemming mechanism.

In testimony whereof I have hereunto subscribed my name.

WILLIAM C. BRIGGS.

Witnesses:
W. A. WILKINSON,
A. W. HICKS.